United States Patent
Dormody (10) Patent No.: US 11,294,099 B1
(45) Date of Patent: Apr. 5, 2022

(54) SYSTEMS AND METHODS FOR CALIBRATING WEATHER STATIONS USING MAXIMUM ALLOWED ALTITUDE ERRORS

(71) Applicant: NextNav, LLC, Sunnyvale, CA (US)

(72) Inventor: Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 317 days.

(21) Appl. No.: 16/351,219

(22) Filed: Mar. 12, 2019

Related U.S. Application Data (60) Provisional application No. 62/716,301, filed on Aug. 8, 2018.

(51) Int. Cl.
*G01W 1/18* (2006.01)
*G01C 5/06* (2006.01)

(52) U.S. Cl.
CPC ............... *G01W 1/18* (2013.01); *G01C 5/06* (2013.01)

(58) Field of Classification Search
CPC .................................. G01W 1/18; G01C 5/06
See application file for complete search history.

(56) References Cited

U.S. PATENT DOCUMENTS

| | | | |
|---|---|---|---|
| 3,589,168 A * | 6/1971 | Hankison | G01N 25/68 374/24 |
| 8,130,141 B2 | 3/2012 | Pattabiraman et al. | |
| 9,057,606 B2 | 6/2015 | Wolf et al. | |
| 9,980,246 B2 | 5/2018 | Pattabiraman et al. | |
| 2009/0143983 A1 * | 6/2009 | Venkatraman | G01C 21/28 701/472 |
| 2015/0127287 A1 * | 5/2015 | Wolf | G01L 27/002 702/98 |
| 2017/0023430 A1 | 1/2017 | Wolf et al. | |

(Continued)

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

(Continued)

*Primary Examiner* — Tarun Sinha
*Assistant Examiner* — Lal C Mang
(74) *Attorney, Agent, or Firm* — MLO, a professional corp.

(57) ABSTRACT

Calibrating weather stations using maximum allowed altitude errors. Particular embodiments described herein include machines that determine a maximum allowed pressure calibration error for a weather station in a network of weather stations, determine a temperature variation associated with an environment in which the weather station resides, determine a maximum allowed altitude error for the weather station using the maximum allowed pressure calibration error and the temperature variation, and use the maximum allowed altitude error to determine if a first maximum possible altitude error associated with a first approach for estimating an altitude of the weather station exceeds the maximum allowed altitude error. If the first maximum possible altitude error associated with the first approach does not exceed the maximum allowed altitude error, the first approach is used to estimate an altitude of the weather station for use in calibrating a pressure sensor of the weather station.

21 Claims, 5 Drawing Sheets

(56) References Cited

U.S. PATENT DOCUMENTS

| | | |
|---|---|---|
| 2017/0195984 A1* | 7/2017 | Dormody ................. G01C 5/06 |
| 2017/0239892 A1* | 8/2017 | Buller ................. B23K 26/702 |
| 2017/0280301 A1 | 9/2017 | Chang et al. |
| 2018/0094998 A1* | 4/2018 | Youssef ................. G01L 27/005 |

OTHER PUBLICATIONS

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

* cited by examiner

SYSTEMS AND METHODS FOR CALIBRATING WEATHER STATIONS USING MAXIMUM ALLOWED ALTITUDE ERRORS

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude may have "life or death" consequences for the user of the mobile device since an imprecise estimate of a mobile device's altitude can delay emergency personnel response times. In less dire situations, imprecise estimates of a mobile device's altitude can negatively impact navigation applications by sending a user of the mobile device to the wrong floor of a building or other incorrect location in an environment.

Figure 1:
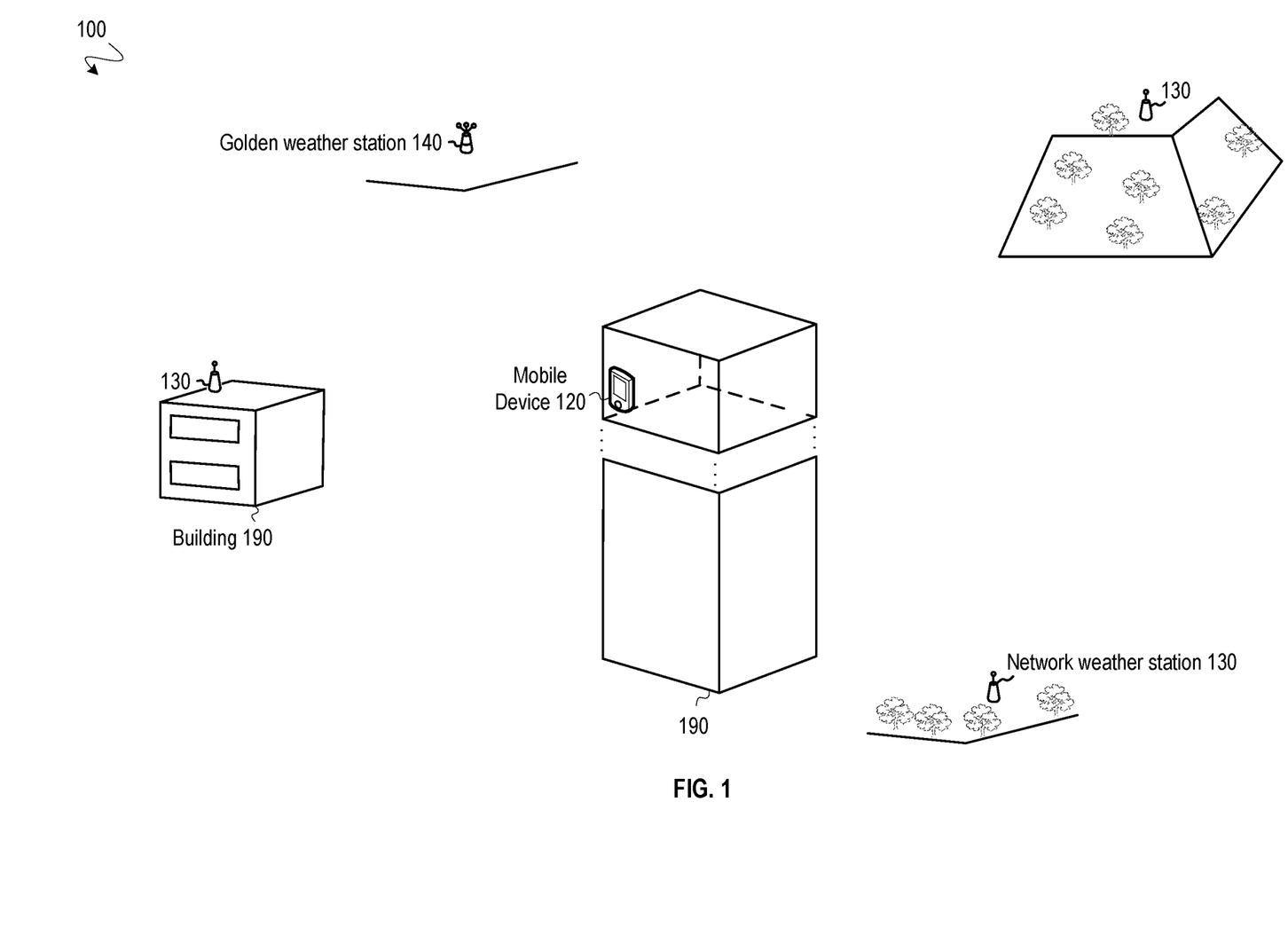
FIG. 1 illustrates a system for estimating altitudes of mobile devices.

In a barometric-based location determination system, such as the system 100 shown in FIG. 1, altitude can be computed using a measurement of pressure from a pressure sensor of a mobile device 120 along with ambient pressure measurement(s) and temperature measurement(s) from a calibrated network of weather stations 130 that have pressure and temperature sensors. An estimate of an altitude of a mobile device ($h_{mobile}$) can be computed by the mobile device 120 or another device that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device, $P_{sensor}$ is an accurate estimate of pressure at the location of a weather station 130 as typically determined by a pressure sensor of the weather station, $T_{remote}$ is an accurate estimate of temperature (e.g., in Kelvin) at the location of the weather station 130 or a different location of a remote temperature sensor, $h_{sensor}$ is an estimated altitude of the weather station 130 (e.g., estimated to within a desired amount of altitude error, such as 0.5 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the weather station 130 can be converted to a reference-level pressure estimate that specifies an estimate of pressure at a reference-level altitude as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the weather station 130, $P_{ref}$ is the reference-level pressure estimate and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude, including mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The accuracy of the estimated altitude of the mobile device 120 depends on the accuracy of each measurement of pressure from each weather station 130 (e.g., from each pressure sensor of each weather station). Unfortunately, such weather stations are typically unstable and susceptible to drift over time. Drift is a phenomenon whereby measurements of pressure from the unstable weather station 130 deviate from the true values of pressure over time. Only small amounts of drift can be tolerated when a floor-level accuracy is required for an estimated altitude of the mobile device 120, since every 10 Pascals of measurement error due to drift can result in approximately 1 meter of error in the estimated altitude of the mobile device 120 from the true altitude of the mobile device 120. Thus, each unstable weather station 130 must be calibrated to account for drift of that unstable weather station 130. One approach used to calibrate an unstable weather station 130 involves (i) converting measurements of pressure of the unstable weather station 130 to respective reference-level pressure estimates for a reference-level altitude (e.g., using Equation 2), (ii) converting measurements of pressure of a stable (i.e., "golden") weather station 140 to corresponding reference-level pressure estimates for the reference-level altitude (e.g., using Equation 2), (iii) determining a time-averaged difference of time-aligned reference-level pressure estimates of the unstable weather station 130 and the stable weather station 140, and (iv) using the time-averaged difference as a calibration value to adjust future measurements of pressure from the unstable weather station 130 or corresponding reference-level pressure estimates determined from the measurements of pressure. Examples of methods for calibrating unstable weather stations are found in U.S. patent application Ser. No. 15/288,274 filed Oct. 7, 2016 (U.S. Pub. No. 2017/0023430 published Jan. 26, 2017), entitled DESIGNING A CALIBRATION SYSTEM FOR USE IN CALIBRATING UNSTABLE SENSORS.

Calibration of an unstable weather station 130 (e.g., of an unstable pressure sensor of the weather station) using Equation 2 to determine reference-level pressure estimates corresponding to that unstable weather station 130 is influenced by accuracy of the estimated altitude of the weather station 130 $h_{sensor}$. Typically, an estimated altitude of a weather station that is within a desired altitude error (e.g., 0.5 meters of altitude) is required for calibration of that weather station. In certain environments (e.g., suburban or rural environments), an estimated altitude to within the desired altitude error can be determined using GNSS or other signal triangulation methods of estimation. Unfortunately, the morphology around a location of a weather station 130 in other environments (e.g., an urban environment) can degrade the accuracy of signal triangulation methods such that an estimated altitude produced by those methods will not be within the desired altitude error in those environments. Instead, more-expensive methods of estimation that use survey equipment operated by a trained operator must be used to determine the estimated altitude of the weather station 130 to within the desired altitude error. In some cases, the more-expensive methods of estimation are also unavailable regardless of the morphology around the location of a weather station 130 in an environment. When the more-expensive methods of estimated are available or unavailable, less-accurate methods of estimation are often available, but the less-accurate methods of estimation provide an estimated altitude of a weather station 130 with possible altitude error in excess of the desired altitude error often required by known calibration approaches. Thus, technical solutions are needed to determine if a weather station 130 can be calibrated with an estimated altitude of the weather station 130 that is/was determined using a less-accurate method of estimation that is (i) less costly than more-expensive methods of estimation that are available, and/or (ii) available when more-accurate methods of estimation are unavailable. Such solutions are described herein.

DETAILED DESCRIPTION

Estimating an altitude of a mobile device to within a tolerated amount of altitude error (e.g., 1 meter) is highly desirable, and may have "life or death" consequences for the user that operates the mobile device. One system for estimating altitudes of mobile devices was described previously with reference to FIG. 1 in the Background section of this disclosure. That system uses a network of weather stations that each measure pressure at their respective location. Each of the measured pressures are converted to a respective reference-level pressure at a reference-level altitude before the resultant reference-level pressures are combined into a representative reference-level pressure. By way of example, determination of a reference-level pressure from a measured pressure of a weather station can occur at the weather station, a mobile device, a server, or other suitable machine, and the representative reference-level pressure can be determined by the mobile device, the server, or other suitable machine. Transmission of pressure data (e.g., reference-level pressures computed by the weather station, or measured pressures if reference-level pressures are computed elsewhere) may be made by any known means, including (i) transmission via a transmitter (not shown) that includes or is co-located with the weather station, or (ii) any suitable technique for transmitting data from the weather station to another thing (e.g., a mobile device or a server).

The representative reference-level pressure, the reference-level altitude, and a measurement of pressure at the unknown altitude of the mobile device are input into Equation 1 described previously in the Background section of this disclosure to derive an estimated altitude of the mobile device. The accuracy of the estimated altitude of the mobile device depends on the accuracy of pressure measurements from the weather stations. However, such weather stations are prone to drift, which results in measurements of pressure that differ from true pressure. In order to compensate for drift, each of the weather stations must be calibrated. One known method of calibrating a weather station described previously in the Background section of this disclosure uses an estimated altitude of the weather station that is typically required to be within a desired altitude error (e.g., 0.5 meters) from true altitude in order to increase the likelihood that the weather station is calibrated to within a tolerated amount of pressure error.

There are consequences of restricting calibration of a weather station to circumstances where an estimated altitude of the weather station must be within a desired altitude error (e.g., a predefined error of 0.5 meters that is meant to apply in all situations) from true altitude of the weather station. One consequence is increased cost when more-expensive methods of estimating the altitude to within the desired altitude error from true altitude must be used instead of less-expensive options that would estimate the altitude with possible altitude error in excess the desired altitude error from true altitude of the weather station. Another consequence is not being able to calibrate a particular weather station when an estimated altitude of that weather station is not within the desired altitude error from true altitude of the weather station. Not being able to calibrate the weather station prohibits use of pressure measurements from that weather station in estimating an altitude of a mobile device. In some cases, excluding such a weather station could reduce altitude estimation coverage available to a mobile device (e.g., where the excluded weather station, if suitably calibrated, is the only weather station that could provide a suitable pressure measurement). In other cases, excluding such a weather station could reduce the quality of a representative reference-level pressure used to estimate the altitude of a mobile device (e.g., where the excluded weather station, if suitably calibrated, provides a pressure measurement used to derive a reference-level pressure that is more accurate than an alternative representative reference-level pressure that is not based on the derived reference-level pressure). The following disclosure includes different approaches that each avoid some or all the preceding consequences, and thereby improve past approaches used to calibrate weather stations that provide pressure data used to estimate an altitude of a mobile device. Use of these different approaches advantageously lowers cost, expands altitude estimation coverage, and/or improves reliability of representative reference-level pressures used for estimating an altitude of a mobile device. Each approach determines when different approaches can be used to estimate an altitude of a weather station for use in calibrating that weather station to within a desired level of calibration error. The determination is based on a maximum allowed altitude error of the estimated altitude that is dependent on weather characteristics impacting that weather station. Once the maximum allowed altitude error is known, it is used to perform different operations related to calibrating that weather station to within the desired level of calibration error (e.g., selecting a least-cost altitude estimation option for estimating the altitude of a weather station that will be used to calibrate the weather station to within the desired level of calibration error; e.g., determining if an available altitude estimation option will produce an estimated altitude of a weather station that can be used to calibrate the weather station to within the desired level of calibration error; e.g., determining if an existing estimated altitude for a weather station can be used to calibrate the weather station to within the desired level of calibration error).

As demonstrated by Equation 3 through Equation 12 below, the maximum allowed altitude error in an estimated altitude of a weather that permits the weather station to be calibrated to within a desired level of calibration error depends on temperature characteristics of an environment in which the weather station resides.

An unstable weather station has a sea-level pressure also given by the barometric formula:

$$P_{ref} = P_{WS} \times \exp\left(\frac{g \times M(h_{WS\_true})}{R \times T}\right), \quad \text{(Equation 3)}$$

or $$P_{ref} = P_{WS} \times \exp\left(\frac{g \times M(h_{WS\_estimated})}{R \times T}\right), \quad \text{(Equation 4)}$$

where $P_{WS}$ is a pressure measurement by weather station in Pascals, $P_{ref}$ is an estimated sea-level pressure in Pascals, $h_{WS\_true}$ is the true altitude of the weather station (if known), $h_{WS\_estimated}$ is an estimated altitude of the weather station, T is a measurement of temperature in Kelvin (e.g., by the weather station), g corresponds to the acceleration due to gravity, R is a gas constant, and M is molar mass of air (e.g., dry air or other). The estimated reference pressure of the weather station at height $h_{WS\_estimated}$ comprises the true altitude $h_{WS\_true}$ and the altitude error $h_{WS\_error}$, which provides the following:

$$P_{ref} = P_{WS} \times \exp\left(\frac{g \times M(h_{WS_{true}} + h_{WS\_error})}{R \times T}\right). \quad \text{(Equation 5)}$$

The difference between Equation 3 and Equation 5 is an amount of pressure due to the altitude error $h_{WS\_error}$. This amount of pressure is represented below as a calibration correction term C:

$$C = P_{WS} \times \exp\left(\frac{g \times M(h_{WS\_true} + h_{WS\_error})}{R \times T}\right) - \quad \text{(Equation 6)}$$
$$P_{WS} \times \exp\left(\frac{g \times M(h_{WS\_true})}{R \times T}\right).$$

Rewriting the above equation illuminates the benefit of C in calibrating the weather station without knowing the true altitude of the weather station:

$$P_{WS} \times \exp\left(\frac{g \times M(h_{WS\_true} + h_{WS\_error})}{R \times T}\right) = \quad \text{(Equation 7)}$$
$$P_{WS} \times \exp\left(\frac{g \times M(h_{WS\_true})}{R \times T}\right) + C.$$

The correction term C can be simplified using an approximation of an exponential function derived from a Taylor series expansion, provided the argument is small x<<1:

$$e^x \approx 1 + x \quad \text{(Equation 8)}.$$

The following values can be assumed for different variables in Equation 6: g=9.81 m s$^{-1}$, M=0.0289 kg mol$^{-1}$, R=8.31 J mol$^{-1}$ K$^{-1}$, and T ranges from 270-320 K. Thus, the product gM/R=0.034 K m$^{-1}$, and gMh/RT is less than or equal to 0.001 when $h_{WS\_error}$ is assumed to be at most 10 meters, which is a typical worst-case altitude. The value of C from Equation 6 can be approximated as:

$$C = P_{WS} \times \frac{g \times M}{R \times T}(h_{WS\_true} + h_{WS\_error} - h_{WS\_true}) = \quad \text{(Equation 9)}$$
$$P_{WS} \frac{g \times M}{R \times T}(h_{survey\,error}).$$

While $P_{WS}$ changes throughout the day, $P_{WS}$ typically does not change by more than 1%, and can effectively be treated as a constant. However, T changes significantly over the course of the day (e.g., sometimes by as much as 10% Kelvin), which in turn would change the value of C. The magnitude of the maximum allowable altitude error can be derived from rewriting Equation 9 to determine how much the value C changes when the temperature changes. This change in the value C can be treated as an amount of pressure calibration error $C_{\Delta T}$ as follows:

$$C_{\Delta T} = \quad \text{(Equation 10)}$$
$$P_{WS} \times \frac{g \times M}{R \times T}(h_{WS\_error}) - P_{WS} \times \frac{g \times M}{R \times (T + \Delta T)}(h_{WS\_error}),$$

which can be rewritten as follows:

$$C_{\Delta T} = \frac{P_{WS} \times g \times M \times h_{WS\_error}}{R}\left(\frac{1}{T} - \frac{1}{T + \Delta T}\right) = \quad \text{(Equation 11)}$$
$$\frac{P_{WS} \times g \times M \times h_{WS\_error}}{RT}\left(\frac{\Delta T}{T + \Delta T}\right).$$

Equation 11 is inverted to solve for an amount of altitude error $h_{WS\_error}$ in an estimated altitude of a weather station that permits the weather station to be calibrated to within a designated amount of pressure calibration error $C_{\Delta T}$ given a determined temperature variation $\Delta T$ of the environment in which the weather station resides as follows:

$$h_{WS\_error}(C_{\Delta T}, \Delta T) = \frac{R \times T \times C_{\Delta T}}{g \times M \times P_{WS}}\left(\frac{T + \Delta T}{\Delta T}\right). \quad \text{(Equation 12)}$$

Knowledge of a maximum allowed altitude error ($h_{WS\_error}$) provides insight into how much altitude error in an estimated altitude of a weather station is allowed to keep that weather station calibrated to within a maximum tolerated calibration error provided a temperature distribution $\Delta T$ for the environment in which the weather station resides. The amount of altitude error can permit use of different approaches for estimating the altitude that provide different amounts of tolerated error and may have different costs of implementation. Examples of approaches for estimating the altitude of a weather station include: using a terrain database and a method of determining a vertical distance between terrain and the weather station (e.g., using an estimated latitude and longitude of the weather station to identify an altitude of terrain at that estimated latitude and longitude, measuring a vertical distance between the weather station and terrain below the weather station using a tape measure or a laser range finder, and then determining the altitude as a combination of the altitude of the terrain and the measured vertical distance); using available information about a level of a building at which the weather station is installed (e.g., setting the estimated altitude of the weather as the altitude of a building floor number or rooftop at which the weather station is installed as obtained from a database containing such information or a blueprint of the building adjusted for any known or measured installation height of the weather station, wherein the altitude of the building floor number or rooftop may be the sum of looked-up terrain altitude at the ground-level of the building and a looked-up height of the floor number or rooftop); or using survey equipment (e.g., using a GPS rangefinder that triangulates 3D position using GPS satellites in open sky conditions; however, under non-open sky conditions, a 3D position can be determined from another location with open sky conditions, a 3D distance between that location and the weather station can be determined using a laser rangefinder or other known means, and an altitude of the weather station can be determined using the 3D position and the 3D distances as inputs into known mathematical relationships). Examples of maximum possible altitude errors associated with the previously-listed approaches include: maximum possible altitude error from using a terrain database and a vertical measurement between terrain and weather station (e.g., up to 2 meters of error mainly depending on accuracy of the estimated latitude and longitude and variability of terrain altitudes around the estimated latitude and longitude); maximum possible altitude error from using information about a level of a building (e.g., up to 3 meters of error); maximum possible altitude error from using survey equipment (e.g., less than 0.5 meters). Use of survey equipment typically has the highest cost and/or is the least-available of the three approaches given the equipment and labor required, while the other two approaches are comparatively less expensive and/or are typically more available.

In general, the maximum allowed altitude error ($h_{WS\_error}$) will decrease as the temperature variation ($\Delta T$) increases, where variation may be represented by a difference in temperature or another type of variation. As the maximum error reduces, the cost to estimate an altitude of a weather station within the maximum allowed altitude error ($h_{WS\_error}$) is likely to increase because more labor and/or expensive equipment is needed to estimate the altitude to within the smaller amount of error as compared to other approaches not requiring the same labor and/or equipment costs that could be used for larger amounts of error. By way of example, San Diego, Calif., has a relatively small temperature variation ($\Delta T$) between hottest time of day and coldest time of day over a period of a few weeks such that the maximum allowed altitude error ($h_{WS\_error}$) is up to 3 meters in order to maintain the maximum allowed pressure calibration error of 1 Pa for a temperature variation of 95% of temperatures in a similar time period of a few weeks ($C_{\Delta T}$). By way of comparison, Denver, Colo., has a larger temperature variation ($\Delta T$) over a period of a few weeks than San Diego, so the maximum allowed altitude error ($h_{WS\_error}$) is 1 meter or less in order to maintain the maximum allowed pressure calibration error ($C_{\Delta T}$) of 1 Pa for 95% of temperatures. Based on these requirements, any of the altitude estimation approaches provided as examples in the previous paragraph can be used in San Diego, and only the survey equipment approach can be used in Denver.

The cost to survey weather stations in Denver is likely to be more expensive than San Diego. Thus, determining the maximum allowed altitude error ($h_{WS\_error}$) can advantageously increase cost-efficiency of providing different networks of weather stations as compared to using the same maximum altitude error for all networks. Cost-efficiency is increased because least-cost or lower-cost approaches for estimating altitudes of weather stations can be identified depending on temperature variations experienced by weather stations. In some cases, the different estimation approaches can be used for different weather stations in the same network of weather stations (e.g., where the different weather stations experience different variations of temperature). In other cases, the same approach can be used for all weather stations of a network of weather stations. In some cases, the temperature variation in an area will vary throughout the year such that some estimation approaches available during one part of a year where the temperature variation is less are not available during another part of the year when the temperature variation is larger. If an approach will only be performed once for a site, and the weather station is planned to be used for the entire year, the estimation can err on the side of caution and pick the most conservative estimation approach during an unstable period of weather— e.g., if a choice is made only estimate the weather sensor height once, and if a coarse method is used during a time period of stable temperature, little or no error would be introduced into the maximum allowed survey error. However, during a new time period of unstable temperature, such as a stormy winter time period, the coarse method would like introduce an unacceptable error. Thus, the conservative approach could be chosen to be performed when weather is a worst-case scenario in order to have acceptable error all year.

Cost to estimate an altitude of weather station is not the only consideration. Sometimes, availability of approaches to estimate an altitude is limited, and there is a need to determine if estimated altitudes produced by those available approaches are suitable for calibrating weather stations.

A process for determining a maximum allowed altitude error permitted for an estimated altitude of a weather station such that the estimated altitude can be used to calibrate the weather station is described below with reference to FIG. 2.

Figure 2:
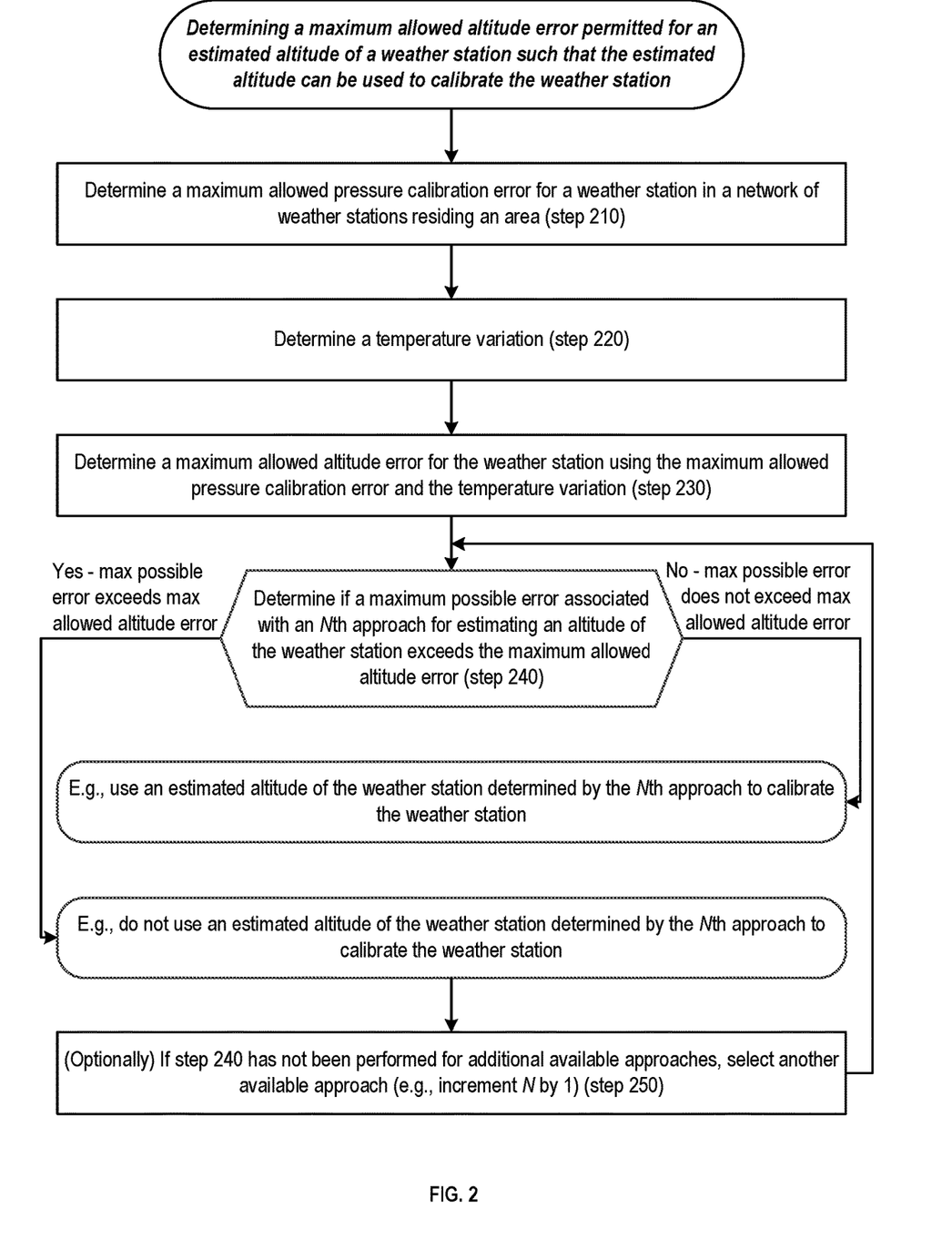
FIG. 2 depicts a method for determining a maximum allowed altitude error permitted for an estimated altitude of a weather station such that the estimated altitude can be used to calibrate the weather station.

Determining a Maximum Allowed Altitude Error Permitted for an Estimated Altitude of a Weather Station Such that the Estimated Altitude can be Used to Calibrate the Weather Station By way of example, FIG. 2 depicts a method for determining a maximum allowed altitude error permitted for an estimated altitude of a weather station such that the estimated altitude can be used to calibrate the weather station. In different embodiments, the process of FIG. 2 is performed using a computer of an enterprise (e.g., a service provider), a server, and/or another suitable machine.

During step 210 a maximum allowed pressure calibration error ($C_{\Delta T}$) for a weather station in a network of weather stations residing an area is determined.

In a first embodiment of step 210, a pressure measurement resolution of the weather station is used to determine the maximum allowed pressure calibration error ($C_{\Delta T}$)—e.g., if the weather station provides pressure measurements to the nearest integer Pascal (Pa), then then the maximum allowed pressure calibration error ($C_{\Delta T}$) is set to that resolution (e.g., 1 Pa). By way of example, the first embodiment can be performed by looking up the maximum allowed pressure calibration error from a data sheet of the weather station.

In a second embodiment of step 210, a fractional amount of a maximum tolerated altitude error in an estimated altitude of a mobile device that is allowed to result from weather station height error can be determined and used to determine the maximum allowed pressure calibration error ($C_{\Delta T}$)—e.g., if a maximum tolerated altitude error in an estimated altitude of a mobile device is 5 meters, and if 25% percent of this error can arise from height error of the weather station, then the maximum allowed pressure calibration error ($C_{\Delta T}$) can be set to an amount of pressure defined by 1.25 meters of height error by finding a differential of a barometric equation as follows:

$$P = P_0 \exp\left(-\frac{gMh}{RT}\right), \quad \text{(Equation 13)}$$

$$\frac{\Delta P}{\Delta h} = -\frac{gMP}{RT}, \quad \text{(Equation 14)}$$

and $$\Delta P = -\frac{gMP}{RT}\Delta h, \quad \text{(Equation 15)}$$

where $\Delta h$=1.25 meters, P=101325 (assumed), T=300 Kelvin (assumed), g=9.8, M=0.0289, and R=8.31, which provides for $\Delta P$=14.375 Pa of maximum allowed pressure calibration error. By way of example, the second embodiment can be performed on a server, computer, or mobile device capable of performing the calculation.

During step 220 a temperature variation ($\Delta T$) during a predefined time period associated with an environment in which the weather station resides is determined.

Figure 3:
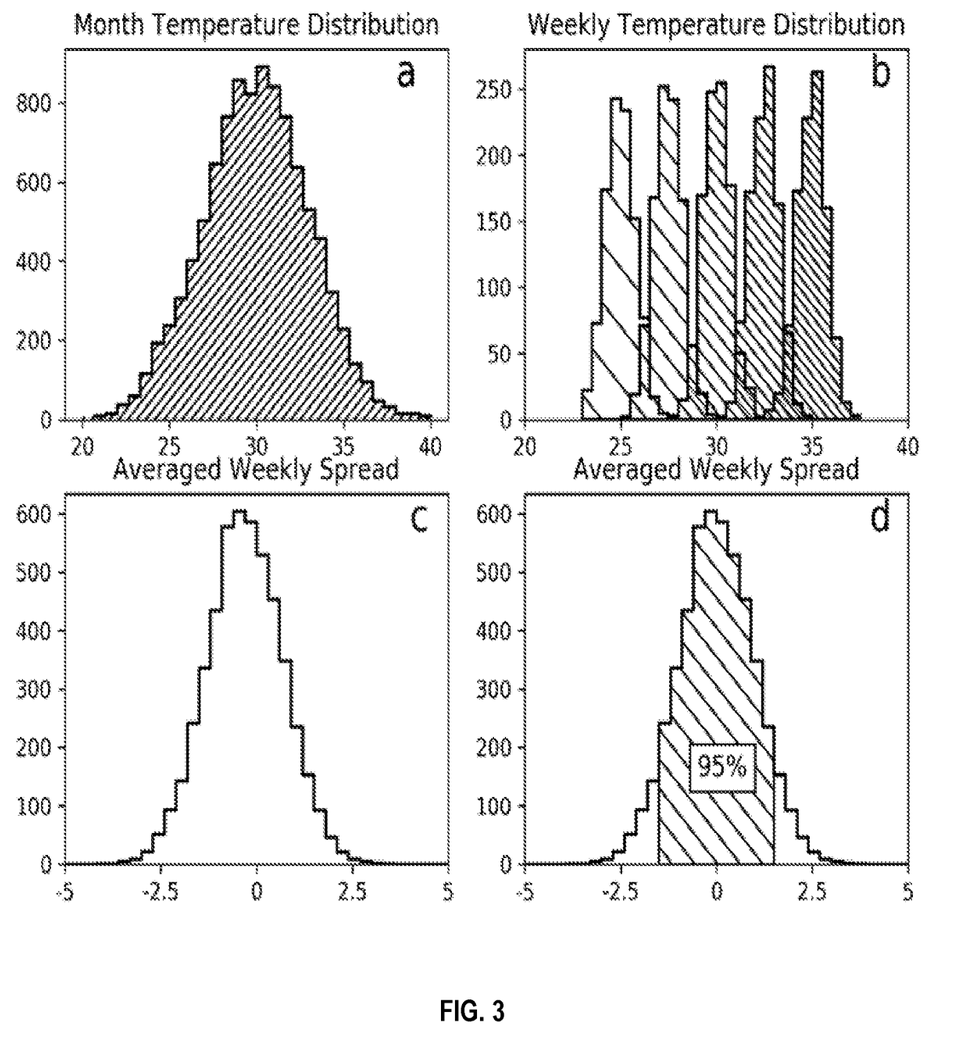
FIG. 3 depicts one approach for deriving a mean-subtracted temperature distribution in a given time period for use as the temperature variation parameter.

In a first embodiment of step 220, the temperature variation ($\Delta T$) is determined by (i) deriving a mean-subtracted temperature distribution of temperatures measured during the predefined time period, (ii) selecting a percentage P % of the mean-subtracted temperatures in the distribution, (iii) determining a range size of the selected mean-subtracted temperatures in the distribution, and (iv) setting the temperature variation ($\Delta T$) to be the range size. By way of example, FIG. 3 depicts one approach for deriving a mean-subtracted temperature distribution in a given time period (e.g., a 1-week calibration period) for use as the temperature variation ($\Delta T$). In plot a, the distribution of temperatures over 5 weeks is determined (e.g., where Celsius temperature measurements are represented in the x-axis, and numbers of temperature measurements are represented in the y-axis). In plot b, the data is divided into weekly distributions. In plot c, the weekly distributions are averaged. In plot d an appropriate statistic is determined for use as the temperature variation ($\Delta T$). For example, $T_{95}$ is the 95% spread over a given week (e.g., about +/−1.5 degrees), which is used as the temperature variation ($\Delta T$).

In a second embodiment of step 220, the temperature variation ($\Delta T$) is determined by (i) identifying the minimum temperature and the maximum temperature from a group of temperatures measured during the predefined time period, (ii) determining a difference in temperature between the minimum temperature and the maximum temperature, divided by 2, and (iii) setting the temperature variation ($\Delta T$) to be the difference in temperature. In one implementation of the second embodiment of step 220, the group of measured temperatures can include all measured temperatures from the predefined time period. In another implantation of the second embodiment of step 220, the group of measured temperatures can include P % (e.g., 95%) of measured temperatures that are closest to the mean of all measured temperatures from the predefined time period to remove outliers from consideration.

Different approaches can be used to determine the predefined time period. One approach defines the predefined time periods based on the frequency at which the weather station is calibrated (e.g., a few days, a few weeks, a month, or a season). The predefined time periods may comprise a single period of time (e.g., the month of July, a particular season, or a period of time with greatest temperature variation in a given year), may comprise a period of time in each of multiple years (e.g., each month of July, the summer season, or period of time with greatest temperature variation for selected years), or may comprise more periods of time in each of multiple years (e.g., every day of past 10 years). The predefined time can also be further split among times of day. For example, such time splits can be midnight to 8 AM, 8 AM to 4 PM, and 4 PM to midnight. The temperature variation can be individually measured during these hours over a specified time period (e.g. weeks), which is useful if different calibrations are applied for different times of the day. Thus, the temperature variation ($\Delta T$) can be based on historical data for an environment in which the weather station resides, and may include data from any point in time. In some implementations, the historical data can consist of data collected by the weather station, or comprise data collected by any number of weather stations or other sources in the environment. The intervals at which temperatures are measured may be any suitable interval of time, and may be preset by the weather station(s) or other source of temperature.

By way of example, use of historical weather data from a market can be used in step 220. The analysis, such as determining the distribution, can be performed on a server, computer, or mobile device capable of running the statistics and accessing the weather data.

During step 230, a maximum allowed altitude error ($h_{WS\_error}$) for the weather station is determined using the maximum allowed pressure calibration error ($C_{\Delta T}$) and the temperature variation ($\Delta T$). In one embodiment, the maximum allowed altitude error ($h_{WS\_error}$) is determined as follows:

$$h_{WS\_error}(C_{\Delta T}, \Delta T) = \frac{R \times T \times C_{\Delta T}}{g \times M \times P_{WS}} \left(\frac{T + \Delta T}{\Delta T}\right), \quad \text{(Equation 16)}$$

where T=300 Kelvin (assumed) or another hypothetical value or is a measured temperature from the weather station or other source, g=9.8, M=0.0289, R=8.31, $\Delta T$ is the temperature variation, $C_{\Delta T}$ is the maximum allowed pressure calibration error, and $P_{WS}$ is an amount of pressure measured by the weather station.

Figure 4:
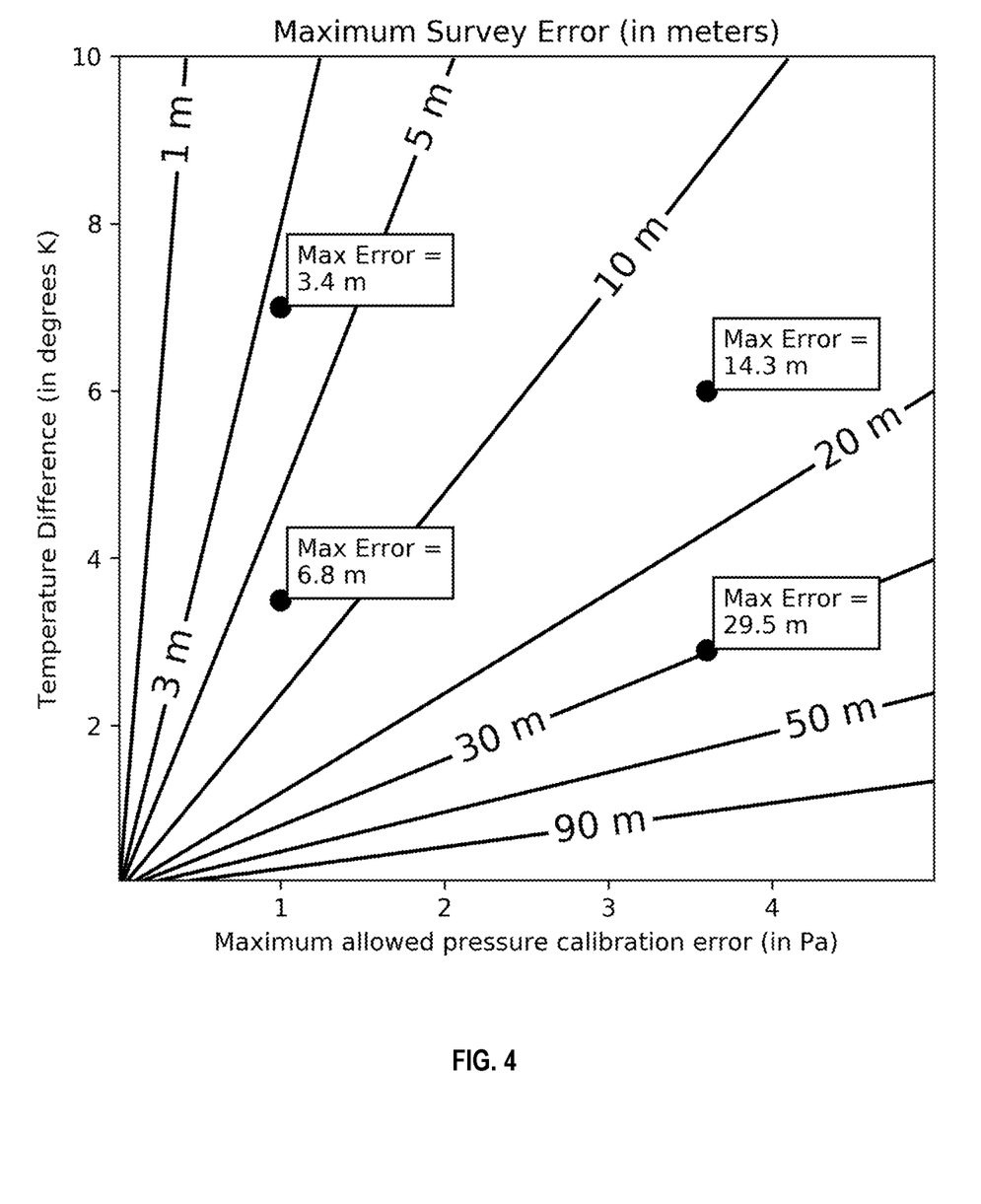
FIG. 4 shows a contour plot illustrating different values of a maximum allowed altitude error given different values of temperature variation and maximum allowed pressure calibration error.

By way of example, FIG. 4 depicts a contour plot illustrating different values of a maximum allowed altitude error ("Max Error") given different values of temperature variation ($\Delta T$) and maximum allowed pressure calibration error ($C_{\Delta T}$). The values in the contour plot assume a nominal measured pressure $P_{WS}$ of 101325 and a temperature T of 300 K. Examples of maximum allowed altitude errors in meters (m) given respective pairs maximum allowed pressure calibration error ($C_{\Delta T}$) is Pascal (Pa) and of temperature variation ($\Delta T$) in Kelvin (K) are shown: (1 Pa, 3.5 K) yields 6.8 m, (1 Pa, 9 K) yields 2.6 m, (3 Pa, 3.5 K) yields 20.4 m; and (3 Pa, 9 K) yields 7.9 m. As can be seen by the plot, maximum allowed altitude errors are less restrictive for smaller distributions of temperature, but much more restrictive for wider distributions of temperature.

By way of example, the formula of step 230 can be calculated on a server, computer, or mobile device capable of performing the calculation.

During step 240, the maximum allowed altitude error ($h_{WS\_error}$) is used to determine if a maximum possible altitude error associated with a Nth approach for estimating an altitude of the weather station exceeds the maximum allowed altitude error ($h_{WS\_error}$). Initially, N=1.

In a first embodiment of step 240, the maximum possible altitude error associated with the Nth approach for estimating an altitude of the weather station is an altitude error in an estimated altitude of the weather station that was determined using the Nth approach. If the maximum possible altitude error does not exceed the maximum allowed altitude error, the weather station is calibrated using the estimated altitude of the weather station that was determined using the Nth approach. If the maximum possible altitude error exceeds the maximum allowed altitude error, the weather station is not calibrated using the estimated altitude of the weather station that was determined using the Nth approach. Optionally, if step 240 has not been performed for additional available approaches, another available approach is identified (step 250), and the process returns to step 240 for that identified approach. Ideally, the weather station is calibrated with an estimated altitude of the weather station (i) that was determined using an available approach and (ii) that has a maximum possible altitude error that does not exceed the maximum allowed altitude error.

In a second embodiment of step 240, the maximum possible altitude error associated with the Nth approach for estimating an altitude of the weather station is an amount of possible error associated with the Nth approach (e.g., a known amount of error the Nth approach can produce). If the maximum possible altitude error associated with the Nth approach does not exceed the maximum allowed altitude error, an estimated altitude of the weather station is determined using the Nth approach, and the weather station is calibrated using that estimated altitude. If the maximum possible altitude error associated with the Nth approach exceeds the maximum allowed altitude error, the Nth approach is not used to determine an estimated altitude of the weather station that is used to calibrate the weather station. In a first implementation of the second embodiment of step 240, when the maximum possible altitude error associated with the Nth approach exceeds the maximum allowed altitude error, the weather station is not calibrated and its pressure measurements are not used to estimate an altitude of a mobile device. In a second implementation of the second embodiment of step 240, when the maximum possible altitude error associated with the Nth approach exceeds the maximum allowed altitude error, another available approach is identified (step 250), and the process returns to step 240 for that identified approach. Ideally, the weather station is calibrated with an estimated altitude of the weather station (i) that was determined using an available approach and (ii) that has a maximum possible altitude error that does not exceed the maximum allowed altitude error. In the second implementation, (i) the maximum allowed altitude error is used to determine if a maximum possible altitude error associated with a second approach for estimating an altitude of the weather station exceeds the maximum allowed altitude error, (ii) if the maximum possible altitude error associated with the second approach does not exceed the maximum allowed altitude error, an estimated altitude of the weather station is determined using the second approach, and the weather station is calibrated using that estimated altitude; and (iii) if the maximum possible altitude error associated with the second approach exceeds the maximum allowed altitude error, the second approach is not used to determine an estimated altitude of the weather station used to calibrate the weather station, or the weather station is not calibrated if no other estimation approaches are available. Alternatively, the weather station is calibrated with the best available method, despite it exceeding the maximum allowable error, and the end solution of altitude reflects a poorer altitude confidence (i.e. the solution is flagged as suspect).

By way of example, the comparison of the output of step 230 and the known error of an Nth approach (e.g., obtained from literature or data sheet) during steps 240 and 250 can be calculated on a server, computer, or mobile device capable of performing the calculation.

In some embodiments, the process of FIG. 2 can be advantageously used to determine a least-cost approach for estimating an altitude of a weather station that can be used to calibrate the weather station—e.g., where an earlier-tested approach (e.g., a first approach) is less costly than a subsequently-tested approach (e.g., a second approach) and/or the subsequently-tested approach (e.g., the second approach) is less costly than yet another subsequently-tested approach (e.g., a third approach). When the process of FIG. 2 is used to identify a least-cost approach for estimating an altitude of a weather station that can be used to calibrate the weather station, (i) another step can be performed before step 240 during which an Nth approach is identified (for N=1), from among all available approaches for estimating the altitude of the weather station, as being the least-cost approach of the available approaches, and (ii) step 250 is performed to identify a least-cost approach from among available approaches for estimating the altitude of the weather station that have not yet been considered during step 240. This process can repeat until the lowest cost approach that can produce an estimated altitude with a maximum possible altitude error that does not exceed the maximum allowed altitude error ($h_{WS\_error}$) is identified (if possible given the circumstances).

Since the amount of altitude error $h_{WS\_error}$ determined for a particular weather station using the approach of FIG. 2 is based on the temperature variation impacting that weather station, different amounts of altitude error can be determined for different weather stations, which is an improvement over past approaches that apply the same amount of tolerated altitude error to all weather stations in the same or different networks. If there is an existing approach that does not apply a maximum amount of tolerated altitude error to each weather station, such an approach would not be able to restrict calibration of all weather stations to within the defined pressure calibration error $C_{AT}$. In contrast, the amount of altitude error $h_{WS\_error}$ determined using the approach of FIG. 2 advantageously determines if an estimated altitude of a weather station can be used to calibrate that weather station to within the defined pressure calibration error $C_{AT}$ such that future pressure measurements of that weather station can be used to estimate an altitude of a mobile device.

Technical Benefits

Mobile devices are routinely used to estimate altitudes of users based on (i) reference pressures from a network of reference pressure sensors and (ii) measurements of pressure from pressure sensors of the mobile devices. Unfortunately, limitations in the functionality of the network of reference pressure sensors can impact the accuracy of estimated altitudes, which impairs different uses of the estimated altitudes (e.g., emergency response, navigation, calibration, etc.). For example, some reference pressure sensors of networks are prone to drift over time and must be calibrated, which requires knowing the altitudes of the reference pressure sensors. Some networks include reference pressure sensors with unknown or approximate altitudes, which impairs or prevents needed calibration. Processes described herein improve the field of calibration by determining when weather stations of unknown or approximate altitudes can be calibrated with estimates of those altitudes that were determined using different methods of estimation. New and useful data is generated, such as data representing a maximum allowed altitude error that can be used to determine when weather stations of unknown altitudes can be calibrated with estimates of those unknown altitudes. In particular, functionality of a weather station (i.e., reference pressure sensor) in a network that is susceptible to producing previously unusable data, such as pressure data with lower-than-desirable accuracy due to sensor drift, is improved by providing opportunities to calibrate that sensor given an uncertain altitude of the weather station. More-reliable weather station networks can be maintained when calibration of the weather stations is enabled by the processes described herein. Performance of the processes described herein also provide for improved uses of legacy weather station networks by generating estimated altitudes of weather stations when such data may not be otherwise available. Without the processes described herein, such legacy networks could not be consistently or reliably calibrated for use in determining pressure-based estimates of mobile device altitudes By improving calibration of weather stations, the field of location determination is improved, since calibrated weather stations are necessary for accurate pressure-based estimation of a mobile device's altitude. More accurate estimation of a mobile device's altitude enables quicker emergency response times or improved uses of estimated altitudes. Also, in some embodiments wherein multiple methods of estimation are suitable for estimating an altitude of a weather station, processes described herein are able to identify less-costly suitable methods of estimation when other approaches cannot.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment.

Figure 5:
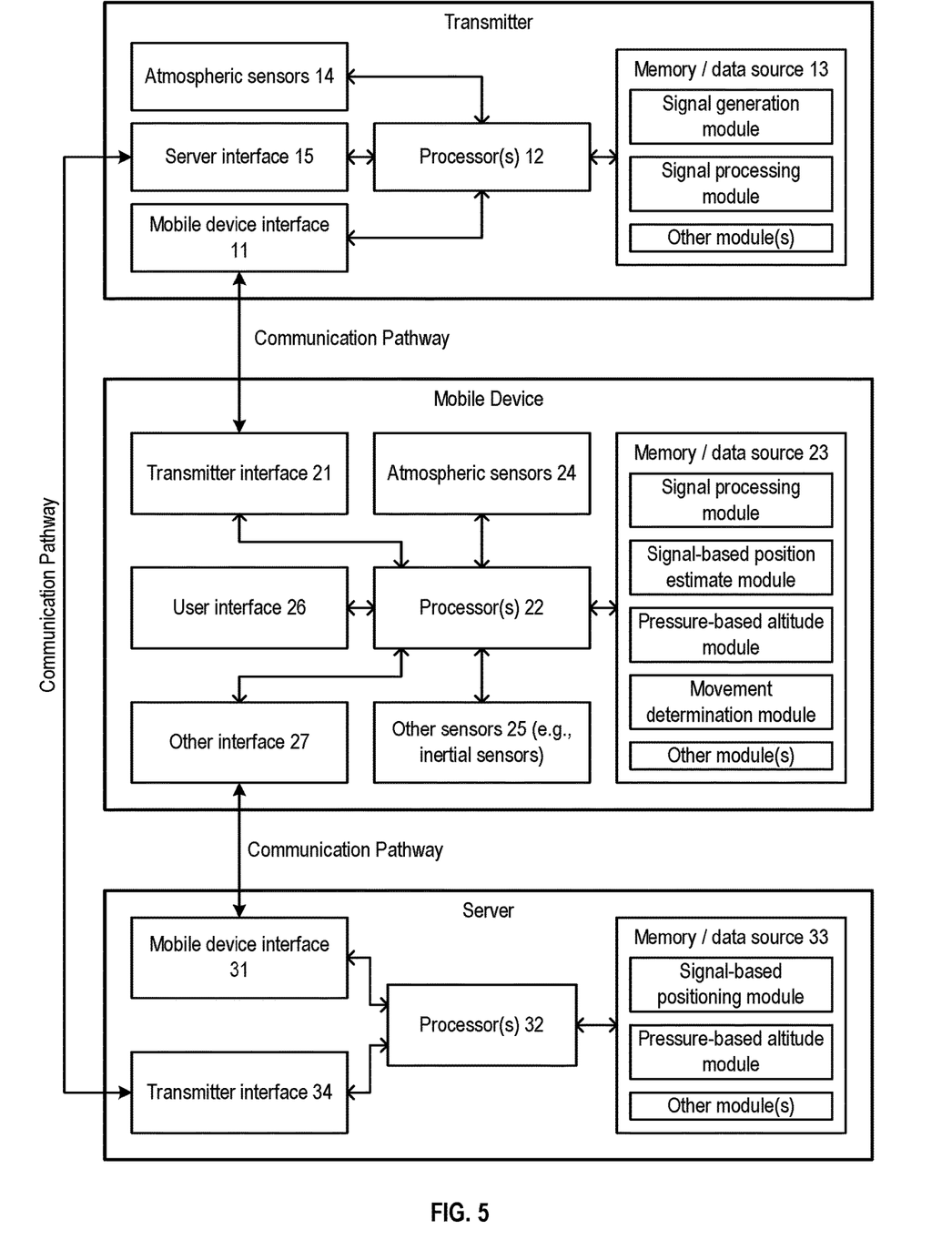
FIG. 5 illustrates components of a transmitter, a mobile device, and a server. Examples of communication pathways among components are shown by arrows between components.

FIG. 5 illustrates components of a transmitter, a mobile device, and a server. Examples of communication pathways are shown by arrows between components.

By way of example in FIG. 5, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii)

generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

In some embodiments, the atmospheric sensors 14 include a weather station. In other embodiments, a stand-alone weather station is substituted for the transmitter, and the stand-alone weather station includes: atmospheric sensors (e.g., a pressure sensor for measuring pressures, a temperature sensor for measuring temperatures); memory (e.g., storing instructions for computing reference-level pressures based on the measured pressures); processor(s) for executing instructions stored in the memory; and any suitable interface for communicating pressure data to other things (e.g., the mobile device and/or the server).

By way of example FIG. 5, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 5, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

This application relates to the following related application(s): U.S. Pat. Appl. No. 62/716,301, filed 8 Aug. 2018, entitled SYSTEMS AND METHODS FOR CALIBRATING WEATHER STATIONS USING MAXIMUM ALLOWED ALTITUDE ERRORS. The content of each of the related application(s) is hereby incorporated by reference herein in its entirety.

The invention claimed is:

1. A method for calibrating a pressure sensor of a weather station using one or more machines, the method comprising:
   determining a maximum allowed pressure calibration error for a weather station in a network of weather stations residing in an area;
   determining, using a machine of the one or more machines, a temperature variation during a predefined time period associated with an environment in which the weather station resides;
   determining, using a machine of the one or more machines, a maximum allowed altitude error for the weather station using the maximum allowed pressure calibration error and the temperature variation;
   selecting, using a machine of the one or more machines, a first approach from among a plurality of approaches for estimating an altitude of the weather station, as being a first least-costly approach of the plurality of approaches;
   using the maximum allowed altitude error to determine, using a machine of the one or more machines, if a first maximum possible altitude error associated with the first approach for estimating the altitude of the weather station exceeds the maximum allowed altitude error;
   if the first maximum possible altitude error associated with the first approach does not exceed the maximum allowed altitude error, using the first approach to estimate the altitude of the weather station and calibrating a pressure sensor of the weather station using the estimated altitude of the weather station; and
   if the first maximum possible altitude error associated with the first approach exceeds the maximum allowed altitude error:
   (a) selecting a second approach for estimating the altitude of the weather station from among the plurality of approaches for estimating the altitude of the weather station, as being a second least-costly approach of the plurality of approaches;

17

(b) using the maximum allowed altitude error to determine if a second maximum possible altitude error associated with the second approach exceeds the maximum allowed altitude error;

(c) if the second maximum possible altitude error associated with the second approach does not exceed the maximum allowed altitude error, using the second approach to estimate the altitude of the weather station and calibrating the pressure sensor of the weather station using the estimated altitude of the weather station; and (d) if the second maximum possible altitude error associated with the second approach exceeds the maximum allowed altitude error, not using the second approach to estimate the altitude of the weather station for use in calibrating the pressure sensor of the weather station.

2. The method of claim 1, wherein the first maximum possible altitude error associated with the first approach for estimating an altitude of the weather station is an altitude error in an estimated altitude of the weather station that was determined using the first approach.

3. The method of claim 1, wherein the first maximum possible altitude error associated with the first approach for estimating an altitude of the weather station is an amount of possible error associated with the first approach.

4. The method of claim 1, wherein the determining a maximum allowed pressure calibration error for a weather station in a network of weather stations residing in an area comprises:

using a pressure measurement resolution of the weather station to determine the maximum allowed pressure calibration error.

5. The method of claim 1, wherein the determining a maximum allowed pressure calibration error for a weather station in a network of weather stations residing in an area comprises:

determining a fractional amount of a maximum tolerated altitude error in an estimated altitude of a mobile device that is allowed to result from weather station height error; and using the determined fractional amount to determine the maximum allowed pressure calibration error.

6. The method of claim 1, wherein the determining, using a machine of the one or more machines, a temperature variation during a predefined time period associated with an environment in which the weather station resides comprises:

determining, using a machine of the one or more machines, a temperature distribution of temperatures measured during the predefined time period;

selecting a percentage of the temperatures in the distribution;

determining, using a machine of the one or more machines, a range size of the selected percentage of the temperatures in the distribution; and setting the temperature variation to be the range size.

7. The method of claim 1, wherein the determining, using a machine of the one or more machines, a temperature variation during a predefined time period associated with an environment in which the weather station resides comprises:

identifying, using a machine of the one or more machines, a minimum temperature and a maximum temperature from a group of temperatures measured during the predefined time period;

18 determining, using a machine of the one or more machines, a difference in temperature between the minimum temperature and the maximum temperature and dividing by 2; and setting the temperature variation to be the difference in temperature, divided by 2.

8. The method of claim 1, wherein the using the first approach to estimate an altitude of the weather station comprises:

using an estimated latitude and longitude of the weather station to identify an altitude of terrain at that estimated latitude and longitude, measuring a vertical distance between the weather station and terrain below the weather station, and estimating the altitude as a combination of the altitude of the terrain and the measured vertical distance;

estimating the altitude of the weather station as a combination of an altitude of a building level at which the weather station is installed and an installation height of the weather station above the building level if known; or using survey equipment to estimate the altitude of the weather station.

9. One or more non-transitory machine-readable media embodying program instructions that, when executed by one or more machines, cause the one or more machines to implement the method of claim 1.

10. A system for calibrating a pressure sensor of a weather station, the system comprising: a memory comprising computer-executable instructions; and a machine configured to execute the computer-executable instructions and cause the system to perform the method of claim 1.

11. A method performed by one or more machines for calibrating a pressure sensor of a weather station, the method comprising:

determining a maximum allowed pressure calibration error for a weather station in a network of weather stations residing in an area;

determining, using a machine of the one or more machines, a temperature variation during a predefined time period associated with an environment in which the weather station resides;

determining, using a machine of the one or more machines, a maximum allowed altitude error for the weather station using the maximum allowed pressure calibration error and the temperature variation;

using the maximum allowed altitude error to determine, using a machine of the one or more machines, if a first maximum possible altitude error associated with a first approach for estimating an altitude of the weather station exceeds the maximum allowed altitude error;

if the first maximum possible altitude error associated with the first approach does not exceed the maximum allowed altitude error, using the first approach to estimate the altitude of the weather station and calibrating a pressure sensor of the weather station using the estimated altitude of the weather station; and if the first maximum possible altitude error associated with the first approach exceeds the maximum allowed altitude error, not using the first approach to estimate the altitude of the weather station for use in calibrating the pressure sensor of the weather station, wherein determining, using a machine of the one or more machines, a maximum allowed altitude error for the weather station using the maximum allowed pressure calibration error and the temperature variation comprises:

determining a first value by multiplying the maximum allowed pressure calibration error with a temperature value and a gas constant;

determining a second value by multiplying a measurement of pressure from the pressure sensor of the weather station with an acceleration due to gravity and a molar mass of air;

determining a third value by dividing a sum of the temperature value and the temperature variation by the temperature value;

determining a fourth value by dividing the first value by the second value;

determining a fifth value by multiplying the third value and the fourth value; and setting the maximum allowed altitude error as the fifth value.

12. The method of claim 11, wherein the method comprises:

if the first maximum possible altitude error associated with the first approach exceeds the maximum allowed altitude error, calibrating the pressure sensor of the weather station using another estimate of the altitude of the weather station that was determined using a second approach for estimating the altitude of the weather station.

13. The method of claim 11, wherein the first maximum possible altitude error associated with the first approach for estimating an altitude of the weather station is an altitude error in an estimated altitude of the weather station that was determined using the first approach.

14. The method of claim 11, wherein the first maximum possible altitude error associated with the first approach for estimating an altitude of the weather station is an amount of possible error associated with the first approach.

15. The method of claim 11, wherein the determining a maximum allowed pressure calibration error for a weather station in a network of weather stations residing in an area comprises:

using a pressure measurement resolution of the weather station to determine the maximum allowed pressure calibration error.

16. The method of claim 11, wherein the determining a maximum allowed pressure calibration error for a weather station in a network of weather stations residing in an area comprises:

determining a fractional amount of a maximum tolerated altitude error in an estimated altitude of a mobile device that is allowed to result from weather station height error; and using the determined fractional amount to determine the maximum allowed pressure calibration error.

17. The method of claim 11, wherein the determining, using a machine of the one or more machines, a temperature variation during a predefined time period associated with an environment in which the weather station resides comprises:

deriving, using a machine of the one or more machines, a temperature distribution of temperatures measured during the predefined time period;

selecting a percentage of the temperatures in the distribution;

determining, using a machine of the one or more machines, a range size of the selected percentage of the temperatures in the distribution; and setting the temperature variation to be the range size.

18. The method of claim 11, wherein the determining, using a machine of the one or more machines, a temperature variation during a predefined time period associated with an environment in which the weather station resides comprises:

identifying, using a machine of the one or more machines, a minimum temperature and a maximum temperature from a group of temperatures measured during the predefined time period;

determining, using a machine of the one or more machines, a difference in temperature between the minimum temperature and the maximum temperature and dividing by 2; and setting the temperature variation to be the difference in temperature, divided by 2.

19. The method of claim 11, wherein the using the first approach to estimate an altitude of the weather station comprises:

using an estimated latitude and longitude of the weather station to identify an altitude of terrain at that estimated latitude and longitude, measuring a vertical distance between the weather station and terrain below the weather station, and estimating the altitude as a combination of the altitude of the terrain and the measured vertical distance;

estimating the altitude of the weather station as a combination of an altitude of a building level at which the weather station is installed and an installation height of the weather station above the building level if known; or using survey equipment to estimate the altitude of the weather station.

20. One or more non-transitory machine-readable media embodying program instructions that, when executed by one or more machines, cause the one or more machines to implement the method of claim 11.

21. A system for calibrating a pressure sensor of a weather station, the system comprising: a memory comprising computer-executable instructions; and a machine configured to execute the computer-executable instructions and cause the system to perform the method of claim 11.

* * * * *